(12) United States Patent
Toelge

(10) Patent No.: US 9,296,369 B2
(45) Date of Patent: Mar. 29, 2016

(54) BRAKE CONTROL SYSTEM FOR MOTOR VEHICLES, HAVING AN ELECTRONIC CONTROL DEVICE

(71) Applicant: Bayerische Motoren Werke Aktiengesellschaft, Munich (DE)

(72) Inventor: Thomas Toelge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/514,565

(22) Filed: Oct. 15, 2014

(65) Prior Publication Data

US 2015/0112567 A1 Apr. 23, 2015

(30) Foreign Application Priority Data

Oct. 17, 2013 (DE) .......................... 10 2013 221 124

(51) Int. Cl.
| | | |
|---|---|---|
| *G06F 7/70* | (2006.01) | |
| *B60T 7/04* | (2006.01) | |
| *B60T 8/171* | (2006.01) | |
| *B60T 8/24* | (2006.01) | |
| *B60T 8/58* | (2006.01) | |
| *B60T 8/40* | (2006.01) | |
| *B60T 13/66* | (2006.01) | |

(52) U.S. Cl.
CPC .................. *B60T 7/042* (2013.01); *B60T 8/171* (2013.01); *B60T 8/24* (2013.01); *B60T 8/243* (2013.01); *B60T 8/245* (2013.01); *B60T 8/4086* (2013.01); *B60T 8/58* (2013.01); *B60T 13/662* (2013.01); *B60T 2220/04* (2013.01); *B60T 2270/82* (2013.01)

(58) Field of Classification Search
CPC ........... B60T 7/042; B60T 8/171; B60T 8/24; B60T 8/243; B60T 8/245; B60T 8/4086; B60T 8/58; B60T 13/662
See application file for complete search history.

(56) References Cited

U.S. PATENT DOCUMENTS

| | | | | | |
|---|---|---|---|---|---|
| 4,826,255 | A | * | 5/1989 | Volz ...................... | B60T 8/4031 |
| | | | | | 188/345 |
| 5,611,606 | A | * | 3/1997 | Nell ........................ | B60T 8/266 |
| | | | | | 303/115.2 |

(Continued)

FOREIGN PATENT DOCUMENTS

| DE | 44 27 246 C2 | 7/1996 |
|---|---|---|
| DE | 10 2010 025 252 A1 | 12/2011 |

(Continued)

OTHER PUBLICATIONS

English Machine Translation of DE102004054922, dated: Jun. 8, 2006, all pages, retrieved from Espacenet.com.*

(Continued)

*Primary Examiner* — Calvin Cheung
(74) *Attorney, Agent, or Firm* — Crowell & Moring LLP

(57) ABSTRACT

The invention is directed to a brake control system having an electronic control device, a brake pedal, via the actuation of which a braking intent in the form of a pedal travel and/or a pilot pressure and/or a pedal force is specifiable by the driver. The system further includes secondary braking components which are controllable decoupled from the brake pedal for setting pressure values in the wheel brake cylinders of a motor vehicle wheel. According to the invention, the brake pedal characteristic is variably specifiable as a function of defined conditions.

15 Claims, 3 Drawing Sheets

(56) References Cited

U.S. PATENT DOCUMENTS

| | | | | |
|---|---|---|---|---|
| 6,033,039 | A * | 3/2000 | Dieringer | B60T 8/3275 |
| | | | | 303/113.3 |
| 2003/0011241 | A1 * | 1/2003 | Batistic | B60T 8/1766 |
| | | | | 303/146 |
| 2010/0269683 | A1 * | 10/2010 | Anderson | B60T 7/042 |
| | | | | 91/369.1 |
| 2011/0185723 | A1 * | 8/2011 | Ganzel | B60T 7/042 |
| | | | | 60/547.1 |
| 2012/0073922 | A1 | 3/2012 | Kaestner et al. | |
| 2013/0124063 | A1 * | 5/2013 | Kawakami | B60K 31/00 |
| | | | | 701/93 |

FOREIGN PATENT DOCUMENTS

| | | |
|---|---|---|
| DE | 10 2010 040 726 A1 | 3/2012 |
| DE | 20 2010 017 605 U1 | 11/2012 |
| DE | 10 2011 077 354 A1 | 12/2012 |
| DE | 10 2013 204 778 A1 | 9/2013 |
| EP | 0 867 350 A2 | 9/1998 |
| WO | WO 2013/139825 A2 | 9/2013 |

OTHER PUBLICATIONS

English Machine Translation of DE102013204778, all pages, retrieved from Espacenet.com.*
English Machine Translation of DE102011077354, all pages, retrieved from Espacenet.com.*
English Machine Translation of DE202010017605, all pages, retrieved from Espacenet.com.*
William Strunk Jr., and E.B. White, The Elements of Style, 3rd Edition, all pages, 1979.*
German Search Report dated Mar. 28, 2014, with Statement of Relevancy (Five (5) pages).

* cited by examiner

BRAKE CONTROL SYSTEM FOR MOTOR VEHICLES, HAVING AN ELECTRONIC CONTROL DEVICE

CROSS REFERENCE TO RELATED APPLICATIONS

This application claims priority under 35 U.S.C. §119 from German Patent Application No 10 2013 221 124.4, filed Oct. 17, 2013, the entire disclosure of which is herein expressly incorporated by reference.

BACKGROUND AND SUMMARY OF THE INVENTION

The invention relates to a brake control system for motor vehicles, having an electronic control device, having a brake pedal via the actuation of which a braking intent is specifiable by the driver, having means for detecting the actuation of the brake pedal, and having secondary braking components which are controllable decoupled from the brake pedal for setting a brake pressure in the wheel brake cylinders.

A brake control system of this type is known from EP 0 867 350 B1, for example. This known brake control system has an electronic control device, a brake pedal via the actuation of which a braking intent, in the present case in the form of a pilot pressure value, is specifiable by the driver, and secondary braking components which are controllable decoupled from the brake pedal. The secondary braking components which are controllable decoupled from the brake pedal are in particular hydraulic components such as an ABS or ASC or DSC control loop, for example electrically controllable valves and pumps for conveying pressure means.

In conventional pedal-coupled brake control systems, during normal operation the pressure in the wheel brake cylinders is equal to the pilot pressure. By means of an auxiliary mode, the actual pressure in the wheel brake cylinders may be increased, and may be greater than the pilot pressure. The condition for switching over to the additional auxiliary mode may be triggered by various events. For example, the switchover may take place in an emergency braking mode having increased pressure requirements as the result of exceeding certain actuation thresholds. Similarly, other conditions may result in activation of an additional auxiliary mode.

For further technical background, reference is made to DE 10 2010 040 726 A1, relating to a brake control system for electric or hybrid vehicles having regenerative braking.

In these types of customary braking systems known heretofore, the functional relationship between the brake pedal travel or the brake pedal force and the pilot pressure or the pressure in the wheel brake cylinders is predetermined in the form of a so-called brake pedal characteristic.

The object of the invention is to optimize the brake control systems of the type mentioned at the outset with regard to the brake pedal characteristic.

This object is achieved by the features of claim 1. Advantageous refinements of the invention are the subject matter of the subclaims.

The invention is directed to a brake control system having an electronic control device, having a brake pedal via the actuation of which a braking intent in the form of a pedal travel and/or a pilot pressure and/or a pedal force is specifiable by the driver, and having secondary braking components which are controllable decoupled from the brake pedal for setting pressure values in the wheel brake cylinders of a motor vehicle wheel.

According to the invention, the brake pedal characteristic is variably specifiable as a function of defined conditions.

The invention is based on the following considerations:

Present brake boosters are generally based on a mechanical brake booster. The energy for the brake boosting is generated either by negative pressure or by means of hydraulic pressure. Other systems, for example electrohydraulic or electromechanical brake systems, utilize electrical energy for the brake boosting.

The brake pedal characteristic (the association of the pedal force or the pedal travel with the resulting brake pressure or with the vehicle deceleration), in particular of mechanical brake boosters, is subject to the selection of the mechanical components and the chosen settings. The boost factor and the level of overall assistance may be set for dimensioning the design. In the sensitive response range, the jump upon actuation of the brake pedal may be influenced by the interaction of the sensor plate and the reaction plate, but, at least for mechanical brake boosters, is always predetermined corresponding to the design.

Depending on the driving situation, however, it makes sense to have different brake pedal characteristics. Thus, in normal roadway driving ("on-road travel"), in particular in interaction with an automatic transmission, a design having a pronounced jump characteristic is perceived as pleasant. In addition, a relatively broad pressure hysteresis between the ascending characteristic curve and the descending characteristic curve is perceived as comfortable. However, in other situations, in particular during travel outside normal roadway driving ("off-road travel"), a different brake pedal characteristic without a distinct jump and having a narrower pressure hysteresis is perceived as more pleasant.

Brake pedal actuations which are decoupled from the wheel brake via the actuators (secondary brake circuit components) for the pressure build-up, depending on the application (hydraulic, electrohydraulic, or electromechanical braking system), present the option for providing different curves of the brake pedal characteristic.

The driver's intent (desired braking power or desired vehicle deceleration) may be interpreted via the sensor system (for example, for measuring the brake pedal travel and/or the brake pedal force) at the pedal travel simulator. Either on-road travel or off-road travel in particular or some other driving situation is automatically recognized by an evaluation module internal to the control device, based on the detection of vehicle state or vehicle surroundings parameters, or the driver has the option for manually switching over between various brake pedal characteristics, using a certain control element. The appropriate brake pedal characteristic may thus be implemented corresponding to the driving situation.

One exemplary embodiment of the invention is illustrated in the drawings, which show the following:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
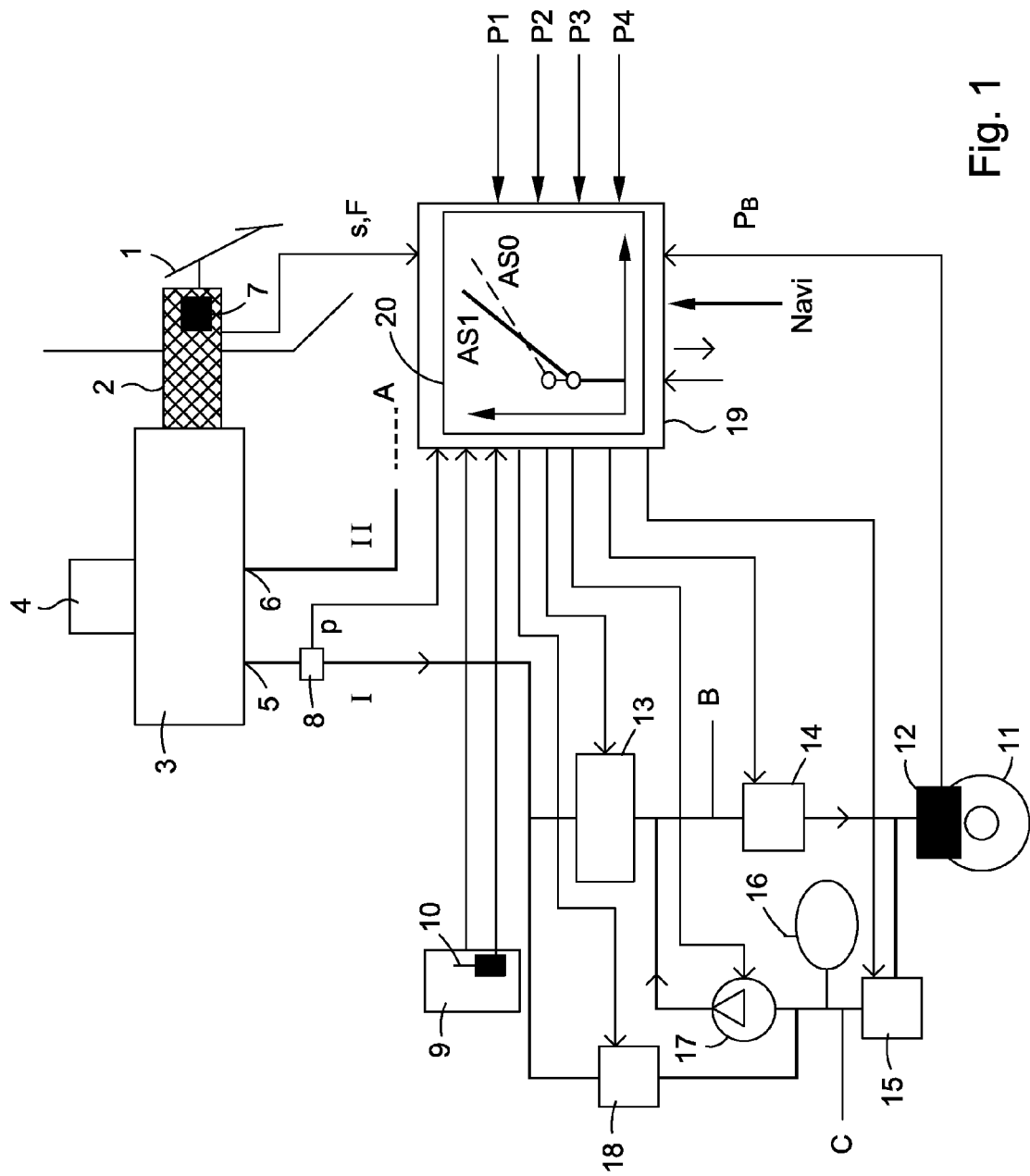
FIG. 1 schematically shows one possible design of the brake control system according to the invention, only one brake circuit being shown.

In FIG. 1, a brake pedal 1 is connected to a vacuum brake booster (not illustrated here) or to a brake pedal simulator 2, in particular for electric brake boosters. A master brake cylinder 3, preferably a tandem master brake cylinder, is connected to the brake booster or brake pedal simulator 2. The master brake cylinder 3 is connected to a brake fluid reservoir 4. The master brake cylinder 3 has two pressure outlets 5 and 6. The pressure outlet 6 is associated, for example, with a front axle brake circuit II, denoted by reference character A but not specifically illustrated. The pressure outlet 5 of the master brake cylinder 3 is connected to a rear axle brake circuit I. For simplification, for the rear axle brake circuit I of the preferably hydraulic brake control system, only one wheel 11 together with the secondary braking components 13 through 18 which are important for the invention are illustrated as an example. The hydraulic connections to the second wheel of the rear axle brake circuit I are denoted by reference characters B and C.

A hydraulic pressure means line leads from the pressure outlet 5 to the changeover valve 13 of the secondary braking components of the rear axle brake circuit I. A pressure means line leads from the changeover valve 13 to the wheel brake cylinder 12 of the wheel 11 via an inlet valve 14. Between the wheel brake cylinder 12 and the inlet valve 14, a further pressure means line leads to an outlet valve 15, which is connected to a recirculation pump 17 on the outlet side. A low-pressure storage chamber 16 branches off between the outlet valve 15 and the recirculation pump. 17. The pressure means line connected to the outlet of the recirculation pump 17 is connected to the pressure means line situated between the changeover valve 13 and the inlet valve 14. In addition, a pressure means line branches off from the pressure means line which connects the pressure outlet 5 and the changeover valve 13, and leads to a load valve 18 for suctioning out pressure means. On the outlet side, this load valve 18 is connected to the pressure means line between the outlet valve 15 and the recirculation pump 17.

The brake control system also has an electronic control device 19, the outputs of which are connected to the secondary brake circuit components, namely, the changeover valve 13, the inlet valve 14, the outlet valve 15, the recirculation pump 17, and the load valve 18, via electrical control lines. FIG. 1 schematically illustrates the most important functional components of the brake control system according to the invention. In addition, for a possibly more detailed configuration of the hydraulic components of the brake control system according to the invention, reference is made to FIG. 1 of DE 44 27 246 C2, which involves a mechanical vacuum brake booster. The secondary brake circuit components 13 through 18 are preferably the components of a customary vehicle brake control system.

As input signals, for example, the control device 19 receives the signal of a brake pedal sensor unit 7, for example in the form of a pedal travel s and/or a pedal force F. In addition, the control device 19 detects the actual brake pressure $p_B$ in the wheel brake cylinders, the vehicle speed P1, the steering angle P2, and roll signals and pitch signals P3, for example, by means of wheel sensors (rotational speed sensors and/or pressure sensors), not illustrated here, via further input lines. Signals P4 which originate from the leveling control or from vertical excitations may likewise be used. In addition, an interface may be provided on the control device 19 via which navigation data (Navi) of a navigation system are detectable, on the basis of which, for example, distinctions may automatically be made between on-road travel and off-road travel, for example, in a relatively easy manner. Also essential to the invention is a function module 20 in the control device 19 by means of which the variable brake pedal characteristics are specifiable.

In normal operation, i.e., without braking force assistance by the secondary braking components 13 through 18, the changeover valve 13 and the inlet valve 14 are open, the outlet valve 15 and the load valve 18 are closed, and the recirculation pump 17 is switched off. This results in a direct connection between the pressure outlet 5 of the tandem master brake cylinder 3 and the wheel brake cylinder 12 via pressure means lines, so that the actual brake pressure $p_B$ in the wheel brake cylinder 12 corresponds to the pilot pressure $p_F$ or the pedal force F.

In the auxiliary mode, overlaying or underlaying of a brake pressure with respect to the pilot pressure $p_F$ takes place by means of the secondary braking components 13 through 18 (underlaying in this design is difficult, but is possible with other embodiments), so that the actual pressure value $p_S$ may be set to be greater or smaller than the pilot pressure $p_F$. Excess volume during pressure reduction is conducted into the low-pressure storage chamber 16, for example.

Figure 3:
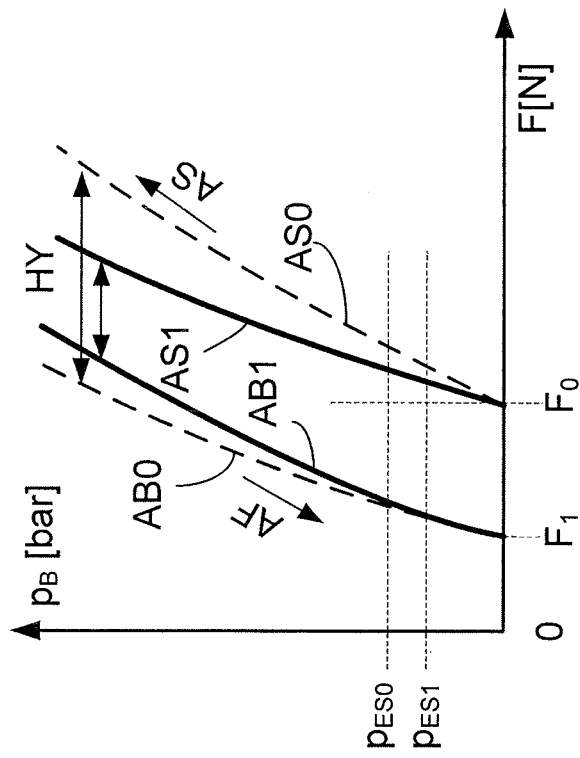
FIG. 3 shows the curve of the brake pressure in the wheel brake cylinders as a function of the pedal force for two different brake pedal characteristics, using an electric brake booster.
Figure 2:
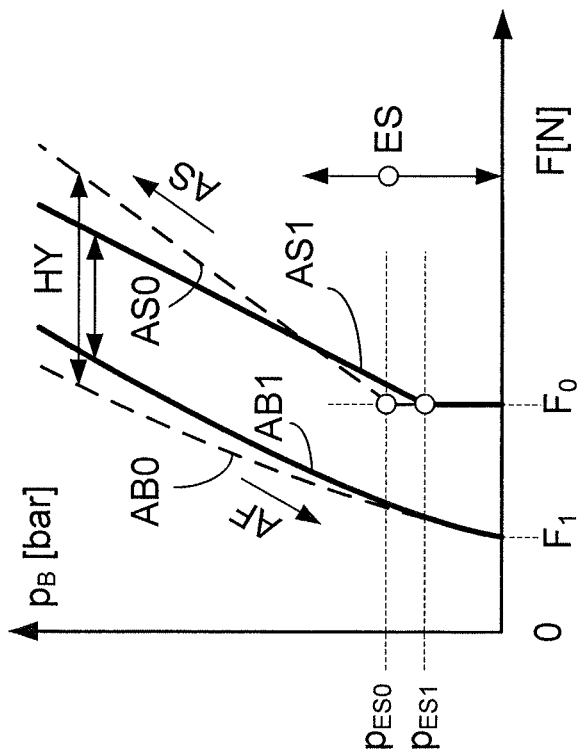
FIG. 2 shows the curve of the brake pressure in the wheel brake cylinders as a function of the pedal force for two different brake pedal characteristics, using a mechanical vacuum brake booster.
Figure 4:
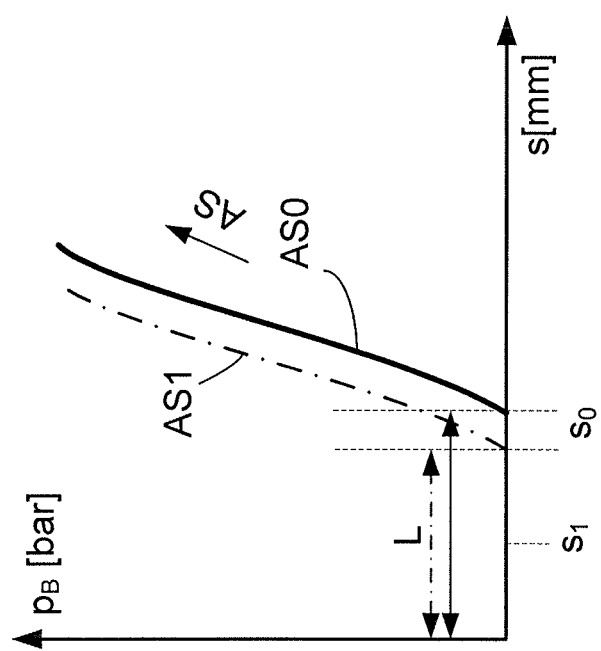
FIG. 4 shows the curve of the brake pressure in the wheel brake cylinders as a function of the pedal travel for two different brake pedal characteristics, using an electric brake booster.

One possible specification of different brake pedal characteristics is illustrated in greater detail in FIGS. 2 through 4. The brake pedal force F is plotted on the abscissa, and the brake pressure $p_B$ is plotted on the ordinate, in FIGS. 2 and 3. The brake pedal travel s is plotted on the abscissa, and the brake pressure $p_B$ is plotted on the ordinate, in FIG. 4.

The function module 20 is designed in such a way that a defined driving situation, in the present case on-road travel or off-road travel, is automatically recognizable as a function of the detected parameters P1, P2, P3, and P4 as well as navigation data (Navi). Each defined driving situation (off-road travel; on-road travel) is an independent brake pedal characteristic (AS1, AB1; AS0, AB0) which is associated as follows:

In the exemplary embodiment illustrated according to FIG. 2, a first defined driving situation is off-road travel, and a second defined driving situation is on-road travel, a brake pedal characteristic having a first pressure rise characteristic curve AS1 being associated with the first defined driving situation and, for example, having a lower jump ES and/or a steeper pressure rise gradient than the second pressure rise characteristic curve AS0 which is associated with the second defined driving situation. For on-road travel, the jump ES has a pressure level $P_{ES0}$, which is known from mechanical vacuum brake boosters, for example, and which is suitable for on-road travel. For off-road travel, for example the jump ES to a lower pressure level $p_{ES1}$ is more pleasant.

In addition, the two different brake pedal characteristics also preferably have different pressure drop characteristic curves AB0 and AB1. The pressure rise characteristic curve AS1 and the pressure drop characteristic curve AB1 for the first driving situation are also designed in such a way that a narrower hysteresis HY results compared to the configuration of the pressure rise characteristic curve AS0 and the pressure drop characteristic curves AB0 for the second defined driving situation. Of course, depending on the characteristics of the vehicle, it is also possible to provide the configuration in precisely the opposite manner. In principle, even more characteristic curves (AS1-n, AB1-n) may be stored.

The exemplary embodiment according to FIG. 3 differs from the exemplary embodiment according to FIG. 2 in that there is no fixed jump ES due to a mechanical vacuum brake booster. Although a variable jump as shown in FIG. 2 could be simulated using a purely electric brake booster, a smoother pressure rise AS as shown in FIG. 3 could also be produced.

One possible variable free travel L is plotted in FIG. 4 (in this case, only as an example for the pressure rise AS) which may be achieved using a purely electric system as needed, in particular when a portion of the braking intent is taken over by regeneration in electric or hybrid vehicles. The free travel L may determine the start $s_0$ of the pressure rise characteristic curves AS0, AS1 and/or the end $s_1$ of the pressure drop characteristic curves. For off-road travel, a smaller free travel L (dash-dotted line) could be perceived as more pleasant than for on-road travel, since the system responds more quickly in this case. Thus, the invention is applicable in different ways using different braking systems.

Alternatively or additionally, a defined driving situation may provide a manual selection mode (not illustrated here), which for switching over from a first brake pedal characteristic (AS0, AB0) into a second or further brake pedal characteristic(s) (AS1-n, AB1-n) is arbitrarily selectable by the driver by actuating a certain control element.

The invention is also applicable for electric or hybrid vehicles having regenerative braking. In this case, the wheel brake pressure $p_B$ corresponds to the differential braking torque between the total braking torque requested via the brake pedal (braking intent, pedal force F, pedal travel s) and the braking torque or negative drive torque produced by regeneration.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake control system for a motor vehicle, the motor vehicle having wheel brake cylinders, the brake control system comprising:
    an electronic control device;
    a brake pedal, via an actuation of which a braking intent is specifiable by a driver;
    means for detecting the actuation of the brake pedal based on at least one of a pedal travel, a pedal force and a pilot pressure; and
    a plurality of secondary braking components which are controllable decoupled from the brake pedal for setting a brake pressure in the wheel brake cylinders as a function of at least one of the pedal travel, the pedal force and the pilot pressure corresponding to a brake pedal characteristic,
    wherein the electronic control device comprises inputs configured to detect a control element signal, vehicle state signals and vehicle surroundings parameters,
    wherein the electronic control device further comprises a function module configured to recognize a defined driving situation as a function of at least one of the detected vehicle state signals and the detected vehicle surrounding parameters, and
    wherein the brake pedal characteristic is variably settable as a function of the recognized driving situation.

2. The brake control system according to claim 1, wherein different brake pedal characteristics are specified at least by different pressure rise characteristic curves which differ with respect to at least one of a particular jump, a free travel and a pressure rise gradient of the pressure rise characteristic curves.

3. The brake control system according to claim 2,
    wherein a first defined driving situation is off-road travel, and a second defined driving situation is on-road travel, and
    wherein a brake pedal characteristic having a first pressure rise characteristic curve being associated with the first defined driving situation and having at least one of a lower jump and a steeper pressure rise gradient than a second pressure rise characteristic curve associated with the second defined driving situation.

4. The brake control system according to claim 2,
    wherein the vehicle surrounding parameters comprises a vehicle speed and a steering angle, and
    wherein the vehicle surrounding parameters further comprises at least one of roll and pitch inclination, vertical movements of the motor vehicle and navigation data.

5. The brake control system according to claim 2,
    wherein a defined driving situation is a manual selection mode for switching over from a first brake pedal characteristic into a second or further brake pedal characteristic, and
    wherein the manual selection mode is arbitrarily selectable by the driver by actuating a control element that delivers the control element signal to the control device.

6. The brake control system according to claim 1, wherein different brake pedal characteristics are specified by different pressure rise characteristic curves and by different pressure drop characteristic curves which differ at least with respect to their hysteresis.

7. The brake control system according to claim 6,
    wherein a first defined driving situation is off-road travel, and a second defined driving situation is on-road travel, and
    wherein a brake pedal characteristic having a first pressure rise characteristic curve being associated with the first defined driving situation and having at least one of a lower jump and a steeper pressure rise gradient than a second pressure rise characteristic curve associated with the second defined driving situation.

8. The brake control system according to claim 6,
    wherein the vehicle surrounding parameters comprises a vehicle speed and a steering angle, and
    wherein the vehicle surrounding parameters further comprises at least one of roll and pitch inclination, vertical movements of the motor vehicle and navigation data.

9. The brake control system according to claim 6,
    wherein a defined driving situation is a manual selection mode for switching over from a first brake pedal characteristic into a second or further brake pedal characteristic, and
    wherein the manual selection mode is arbitrarily selectable by the driver by actuating a control element that delivers the control element signal to the control device.

10. The brake control system according to claim 1,
    wherein a first defined driving situation is off-road travel, and a second defined driving situation is on-road travel, and
    wherein a brake pedal characteristic having a first pressure rise characteristic curve being associated with the first defined driving situation and having at least one of a lower jump and a steeper pressure rise gradient than a second pressure rise characteristic curve associated with the second defined driving situation.

11. The brake control system according to claim 10, wherein the vehicle surrounding parameters comprises a vehicle speed and a steering angle, and
wherein the vehicle surrounding parameters further comprises at least one of roll and pitch inclination, vertical movements of the motor vehicle and navigation data.

12. The brake control system according to claim 10, wherein a defined driving situation is a manual selection mode for switching over from a first brake pedal characteristic into a second or further brake pedal characteristic, and
wherein the manual selection mode is arbitrarily selectable by the driver by actuating a control element that delivers the control element signal to the control device.

13. The brake control system according to claim 1, wherein the vehicle surrounding parameters comprises a vehicle speed and a steering angle, and
wherein the vehicle surrounding parameters further comprises at least one of roll and pitch inclination, vertical movements of the motor vehicle and navigation data.

14. The brake control system according to claim 13, wherein a defined driving situation is a manual selection mode for switching over from a first brake pedal characteristic into a second or further brake pedal characteristic, and
wherein the manual selection mode is arbitrarily selectable by the driver by actuating a control element that delivers the control element signal to the control device.

15. The brake control system according to claim 1, wherein a defined driving situation is a manual selection mode for switching over from a first brake pedal characteristic into a second or further brake pedal characteristic, and
wherein the manual selection mode is arbitrarily selectable by the driver by actuating a control element that delivers the control element signal to the control device.

* * * * *